US009246372B2

(12) United States Patent
Kheifets

(10) Patent No.: US 9,246,372 B2
(45) Date of Patent: Jan. 26, 2016

(54) ROTOR POLE SUPPORT RIBS IN GEARLESS DRIVES

(75) Inventor: Alexander Kheifets, Coquitlam (CA)

(73) Assignee: Fluor Technologies Corporation, Aliso Viejo, CA (US)

( * ) Notice: Subject to any disclaimer, the term of this patent is extended or adjusted under 35 U.S.C. 154(b) by 958 days.

(21) Appl. No.: 13/355,374

(22) Filed: Jan. 20, 2012

(65) Prior Publication Data
US 2013/0189021 A1 Jul. 25, 2013

(51) Int. Cl.
F01D 5/32 (2006.01)
H02K 15/02 (2006.01)
F16B 17/00 (2006.01)
H02K 1/30 (2006.01)
F16B 11/00 (2006.01)

(52) U.S. Cl.
CPC .............. H02K 15/022 (2013.01); F16B 17/00 (2013.01); H02K 1/30 (2013.01); F16B 11/00 (2013.01); H02K 2213/12 (2013.01); Y10T 403/447 (2015.01)

(58) Field of Classification Search
CPC .............. H02K 1/22; H02K 1/28; F01D 5/00; F01D 5/30; F01D 5/3023; F01D 5/303; F01D 5/3038; F01D 5/32; F01D 5/323; F01D 5/326
USPC ......... 403/265–267, 270–272, 345, 381, 219, 403/346; 310/156.08, 156.09, 269, 310/216.074, 216.086; 416/220 R
See application file for complete search history.

(56) References Cited

U.S. PATENT DOCUMENTS

| 2,686,656 | A | * | 8/1954 | Abild | 416/221 |
| 2,928,651 | A | * | 3/1960 | Turnbull | 416/221 |
| 3,309,058 | A | * | 3/1967 | Blackhurst et al. | 416/220 R |
| 3,353,788 | A | * | 11/1967 | Weeds | 416/221 |
| 3,383,095 | A | * | 5/1968 | Anderson | 416/220 R |
| 4,265,595 | A | * | 5/1981 | Bucy et al. | 416/220 R |
| 4,444,544 | A | * | 4/1984 | Rowley | 416/221 |
| 4,527,952 | A | * | 7/1985 | Forestier et al. | 416/220 R |
| 4,999,533 | A | | 3/1991 | King et al. | |
| 5,259,728 | A | * | 11/1993 | Szpunar et al. | 416/2 |

(Continued)

FOREIGN PATENT DOCUMENTS

| WO | 2011/009886 | 1/2011 |
| WO | 2011/019880 | 2/2011 |

OTHER PUBLICATIONS

Patent Cooperation Treaty, "Notification of Transmittal of the International Search Report and the Written Opinion of the International Searching Authority, or the Declaration".

(Continued)

Primary Examiner — Daniel Wiley
(74) Attorney, Agent, or Firm — Fish & Tsang LLP

(57) ABSTRACT

A support rib for securing a rotor pole to a flange in a gearless drive is described. The support rib is undivided and passes through an opening of the flange. The support rib can be joined with the flange and/or the rotor pole using an adhesive. The rib preferably has at least one notch that engages an edge of the flange opening to establish mechanical connection between the rib and flange. An insert with two ends that slideably engages a rib edge and rotor pole channel can be used to couple the rib to the rotor pole.

16 Claims, 6 Drawing Sheets

(56) References Cited

U.S. PATENT DOCUMENTS

| | | | | |
|---|---|---|---|---|
| 5,624,233 | A | * | 4/1997 | King et al. ............... 416/219 R |
| 5,860,787 | A | * | 1/1999 | Richards ................... 416/220 R |
| 7,938,626 | B2 | * | 5/2011 | Forgue et al. ............. 416/221 |
| 2009/0101449 | A1 | | 4/2009 | Breidenstein et al. |
| 2010/0156203 | A1 | | 6/2010 | Nemoto et al. |
| 2011/0291415 | A1 | | 12/2011 | Damen et al. |

OTHER PUBLICATIONS

ABB "Gearless mill drives—Go gearless", Brochure, 2010.
FLSmidth, "SAG/AG Mills—30 years experience with Semi-Autogenous Grinding Mills", http://www.flsmidth.com/en-US/Products/Product+Index/All+Products/Grinding/SAG-AGMills/SAG-AGMills.

* cited by examiner

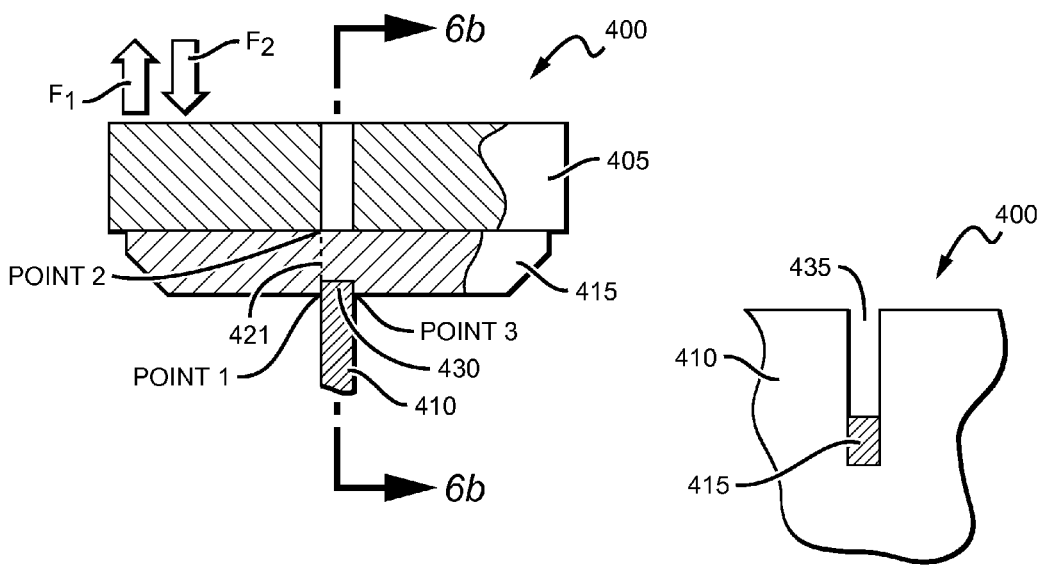
FIG. 6a
FIG. 6b
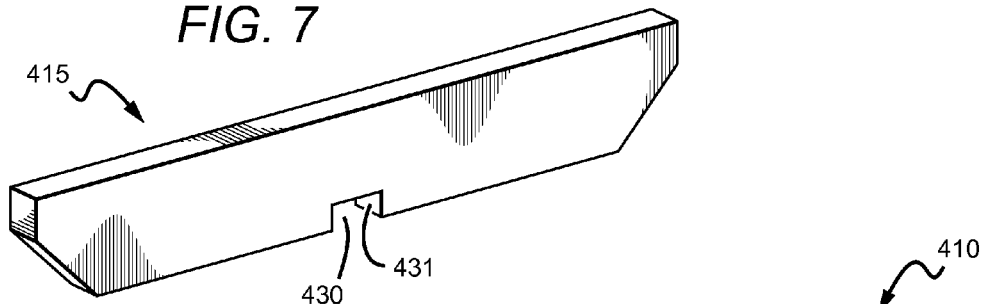
FIG. 7
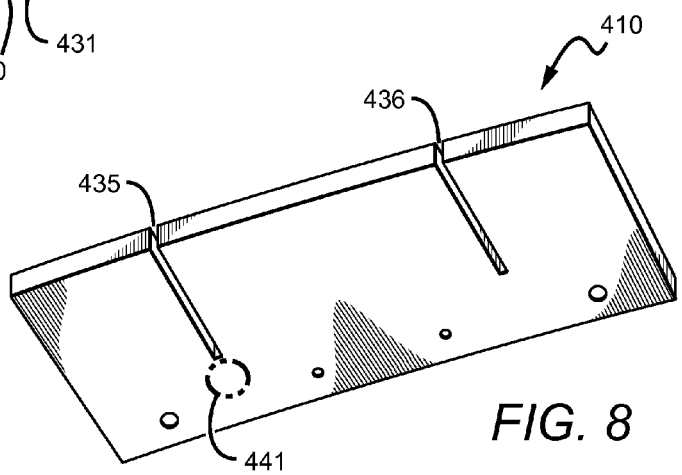
FIG. 8

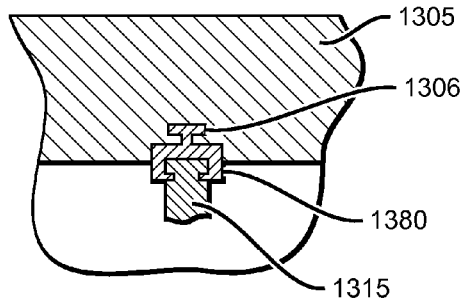
FIG. 13b
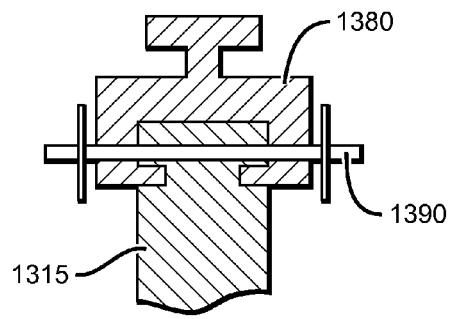
FIG. 13c
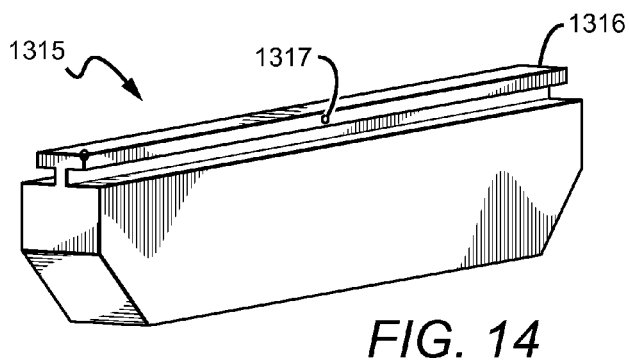
FIG. 14
FIG. 15
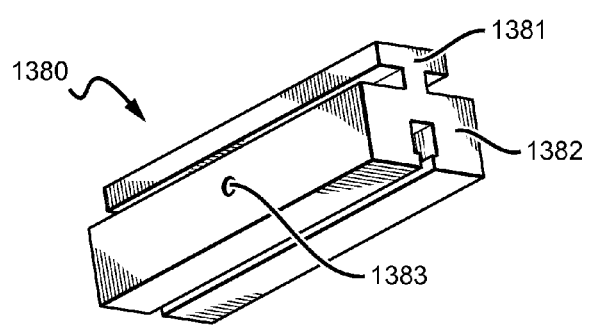

ROTOR POLE SUPPORT RIBS IN GEARLESS DRIVES

FIELD OF THE INVENTION

The field of the invention is gearless drives, more specifically, support ribs for rotor poles.

BACKGROUND

For centuries grinding mills have been used to break up solid materials into smaller pieces. Some of the largest grinding mills today are used in the cement and mining industries. These impressive mills can reach up to 40 feet (13.4 meters) in diameter with 28 mega-watt gearless mill drives ("GMD"). Such mills provide high throughput and round-the-clock operability for meeting the world's ore and cement demand.

The mechanical components that make up the gearless mill drive ("GMD") in grinding mills, such as the rotor poles, flanges, support ribs, and welds are highly susceptible to fatigue and crack propagation. This is due, in part, to cyclic tensile loading caused by gravitational forces and fluctuating magnetic forces. Cracks in mill drive components can lead to costly repairs and lengthy downtime, causing a mill plant substantial financial loss.

The problem of fatigue and crack propagation in GMDs is discussed in more detail in the following papers: "Problem Definition And Repair Of The Rotor Pole Structure On One Of The World's Largest Gearless Drive SAG Mills," by Phil Gunn, SAG 2006; and "Remedial Design Of The World's Largest SAG Mill Gearless Drive," by Meimaris, Lai, & Cox, SAG 2001.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Those of skill in the art have proposed numerous solutions to the problem of fatigue in GMDs. Some of the solutions include: (1) increasing the number of support ribs; (2) increasing the height of the support ribs; (3) adding supporting gussets to the ribs; (4) optimizing the shape of the ribs; and (5) improving weld quality. Unfortunately, these solutions fail to account for the underlying cause of crack propagation: cyclic tensile loading on the weld seams between the ribs and flanges. In addition, these solutions tend to increase the GMD's diameter, weight, and cost.

Another proposed solution is to make the ribs one solid piece that is disposed in an opening of the flange. While this approach addresses the underlying cause of crack propagation by minimizing cyclic tensile loading on the flange-rib seam, the design continues to rely on welds for connecting the ribs to the flanges, which is highly susceptible to fatigue.

It has yet to be appreciated that support ribs for GMDs can be weld-free. Furthermore, it has yet to be appreciated that support ribs for GMDs can couple with flanges and rotor poles via mechanical engagements to improve fatigue resistance. Thus, there is still a need for improved designs for supporting ribs in GMDs.

SUMMARY OF THE INVENTION

The inventive subject matter provides apparatus, systems, and methods in which a gearless drive includes a rotor pole and a flange extending from the rotor pole. The flange has openings for receiving undivided ribs that help to support the flange to the rotor pole. The ribs are disposed in the flange openings and are coupled with the flange and rotor pole via a fastener (e.g., weld, adhesive, mechanical engagement, etc). Each of the ribs has at least one notch configured to engage an edge of the openings. The rib notches can be located on various sides of the rib that come into contact with the opening, including the sides and bottom of the rib. The notches engage or mate with the opening's edges to improve the mechanical connection between the rib and the flange, thus reducing crack propagation and failure from fatigue. Notches can additionally be included along the rotor pole for securely receiving the ribs.

In some embodiments, the rib notches and opening's edges are square-shaped. However, any shape suitable for mating two parts together can be used consistently with the inventive subject matter disclosed herein.

In other embodiments, the gearless drive includes an insert configured to mechanically couple the rib with the rotor pole. Contemplated inserts include a first engaging end configured to slideably engage a notch on the rotor pole and a second engaging end configured to slideably engage a notch on the rib. The insert may also include a through-hole that aligns with a second through-hole disposed on the rib, thus allowing the insertion of a cotter pin.

In some embodiments, the ribs are fastened to the flanges and rotor poles via an adhesive disposed between the notches and flange openings. In other embodiments, the ribs are fastened to the flanges and rotor poles via a combination of adhesive joints, weld joints, and/or mechanical fasteners.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 6a is a cross section view of the pole segment of FIG. 5.

FIG. 6b is a cross section view of the flange and rib shown in FIG. 6a.

FIG. 7 is a perspective view of the rib in FIG. 5.

FIG. 8 is a perspective view of the flange of FIG. 5.

FIGS. 13a-c are cross section views of the rotor pole segment of FIG. 12.

FIG. 14 is a perspective view of the rib in FIG. 12.

FIG. 15 is a perspective view of the insert in FIG. 12.

DETAILED DESCRIPTION

One should appreciate that the disclosed techniques provide many advantageous technical effects including support ribs for rotor poles in gearless drives that have improved mechanical connections to provide resistance to fatigue and crack propagation.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
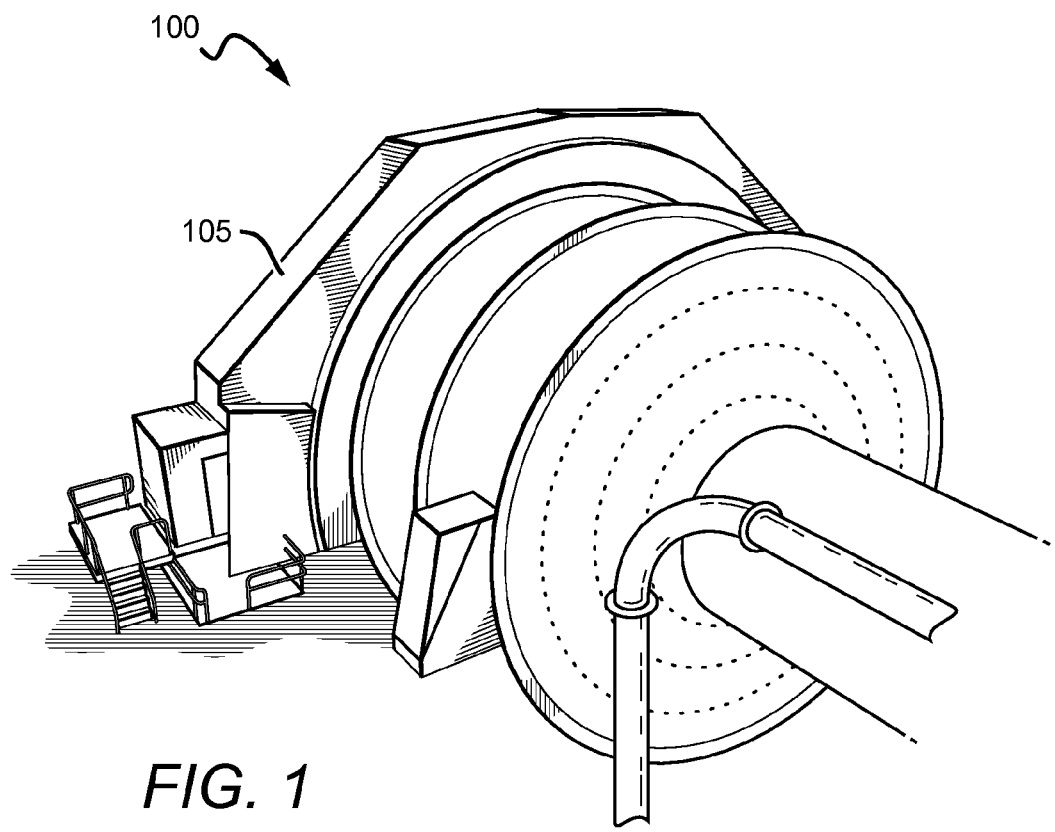
FIG. 1 is a schematic of a grinding mill plant that utilizes a gearless mill drive.

FIG. 1 shows a typical grinding mill plant 100, which utilizes a gearless drive 105. Plant 100 can grind material in a continuous fashion and preferably operates with minimal downtime in order to increase plant productivity. Grinding mill plants are well known and plant 100 could have numerous design configurations (e.g., autogenous grinding mill, semi-autogenous grinding mill, tube grinding mill, etc.). Those of skill in the art will appreciate that many different sizes and types of grinding mill plants can utilize the inventive concepts for gearless drives that are disclosed herein.

Figure 2:
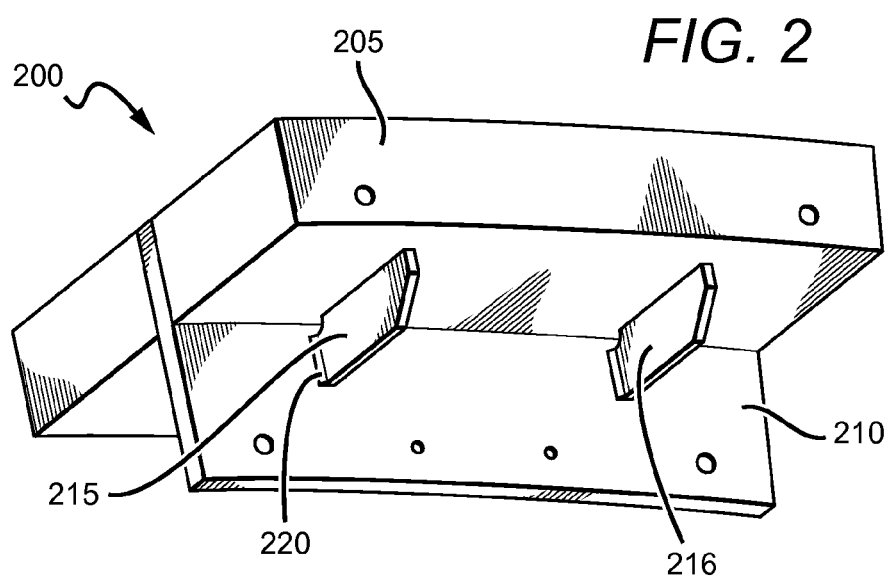
FIG. 2 is a perspective view of a rotor pole segment with a flange and divided ribs.

FIG. 2 shows a perspective view of a rotor pole segment 200. Segment 200 includes rotor pole 205, flange 210, and ribs 215, 216. On the other side of flange 210 are two additional ribs (not shown). Rib 215 is welded to flange 210 via weld 220. Ribs 215, 216 are "divided ribs," meaning that they do not pass through flange 210; rather, each of ribs 215, 216 have an opposing rib disposed on the opposite side of flange 210 (see FIG. 4).

Figure 3:
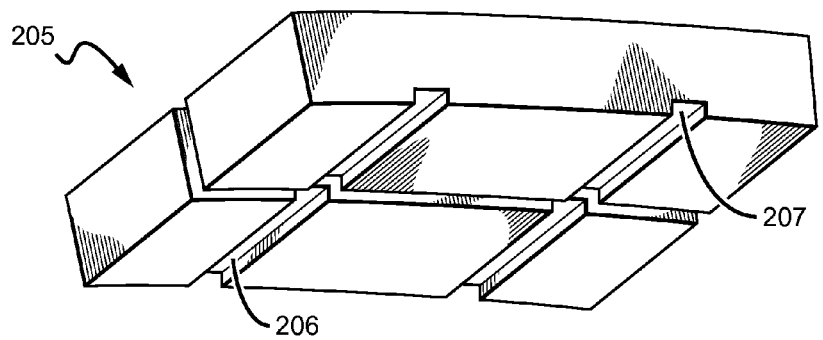
FIG. 3 is a perspective view of the rotor pole of FIG. 2.

FIG. 3 shows a perspective view of rotor pole 205. Rotor pole 205 has a channel 206, which is configured to receive an edge of rib 215. Rotor pole 205 has a second channel 207 for receiving a second rib. Those of skill in the art will appreciate that any number of ribs can be included to support rotor pole 205 on flange 210.

Figure 4:
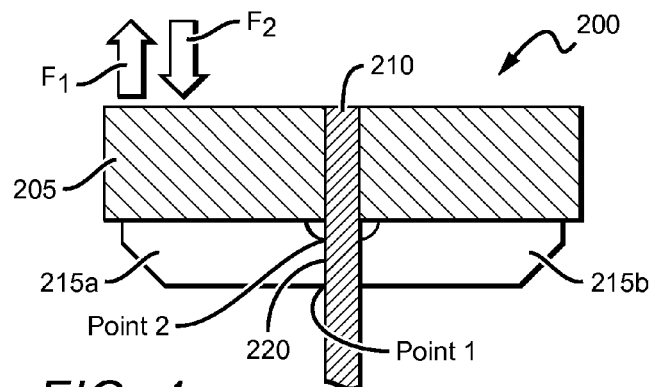
FIG. 4 is a cross-section view of the rotor pole segment of FIG. 2.

FIG. 4 shows a side view of a cross section of segment 200. $F_1$ and $F_2$ represent the direction of magnetic and gravitational forces applied to rotor pole segment 200 as it rotates during operation. Rib 215 comprises two separate pieces (rib 215a and rib 215b) divided by flange 210. Rib 215a is welded to flange 210 from point 1 to point 2 along weld 220. Weld 220 experiences cyclic tensile-compression loading from fluctuating bending moments caused by fluctuating gravitational and magnetic forces. When the resulting net force is acting in the direction of $F_1$, point 1 will experience a tensile stress $\sigma_1$ while point 2 will experience a compressive stress $-\sigma_2$. When the resulting net force is acting in the direction $F_2$, point 1 will experience a compressive stress $-\sigma_1$ while point 2 will experience a tensile stress $\sigma_2$. This cyclic tensile loading can lead to crack propagation and eventual failure of weld 220 from fatigue.

Figure 5:
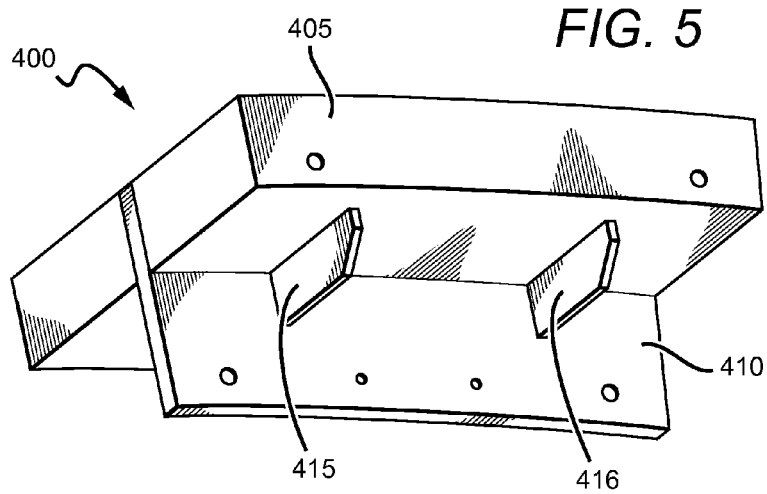
FIG. 5 is a perspective view of a rotor pole segment with a flange and undivided ribs.

FIG. 5 shows a perspective view of a rotor pole segment 400, which includes a rotor pole 405, flange 410, and ribs 415, 416. Ribs 415, 416 are "undivided ribs," meaning that they pass through flange 410 and have an opposing portion that extends to the opposite side of flange 410 (see FIG. 6a).

FIG. 6a shows a cross section view of segment 400 and FIG. 6b shows a cross section view at the line 6b-6b shown in FIG. 6a. Undivided rib 415 passes through an opening 435 of flange 410. Unlike rotor pole segment 200 in FIG. 2, the length between point 1 and point 2 in segment 400 is occupied by rib 415. Rib 415 has a notch 430 that engages an edge of opening 435. Rib 415 is welded to flange 410 from point 1 to point 2 via weld 421. When the resulting net force is acting in the direction of F1, weld 421 at point 1 will experience minimal tensile stress due to the part-to-part compressive contact between rib 415 and flange 410 at point 3. This part-to-part contact helps to transfer tensile stress from point 1 into the rib itself via point 3. The reduced tensile stress at point 1 provides better resistance to crack propagation and fatigue.

As used herein, the term "notch" means an indentation or depression in a surface. The term notch is not intended to imply any particular length-to-width ratio for an indentation. As such, the term notch includes long and narrow indentations (e.g., grooves and channels) and short and wide indentations (e.g., cuts). Notches can include any shape suitable for providing a mechanical connection between two parts. Examples of contemplated notch shapes include, but are not limited to, V-shaped, square, semi-circle, and irregular polygons. As used herein, the term "engage" simply means to occupy a space between or around another component. The term "engage" is not intended to require a secure locking mechanism.

FIG. 7 shows rib 415 of segment 400. The bottom side of rib 415 has a notch 430. As used herein, the terms "bottom surface" and "bottom side" of a rib mean the side of the rib that defines a thickness of the rib and faces away from the rotor pole. Notch 430 has a side 431. When rib 415 engages opening 435 of flange 410 (see FIG. 8), side 431 will cover area 441. In this manner, rib 415 "engages" flange 410. Flange 410 also has a second opening 436 for receiving a second rib. Notch 430 provides the mechanical contact between Rib 415 and flange 410, which can improve resistance to fatigue of the joined surfaces. While FIG. 8 shows openings 435, 436 as slots, those of skill in the art will appreciate that two holes could alternatively be used, as long as the holes are large enough to receive rib 415.

The overall shape and dimensions of rib 415 can be optimized to provide the necessary support in a gearless drive without unduly adding to the weight, cost, parts number, and assembly of the gearless drive. Those of skill in the art will appreciate that numerous sizes and configurations of ribs can be used consistently with the inventive subject matter disclosed herein.

Figure 9A:
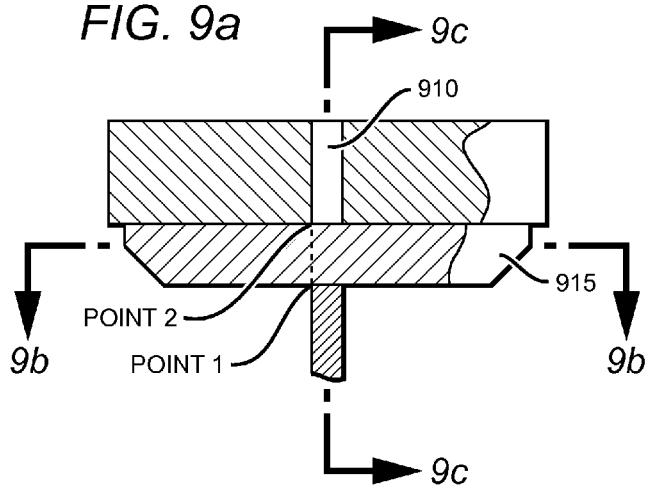
FIGS. 9a-c are cross section views of another embodiment of a rib and flange.
Figure 9B:
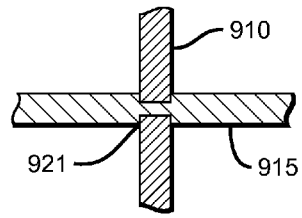
Figure 9C:
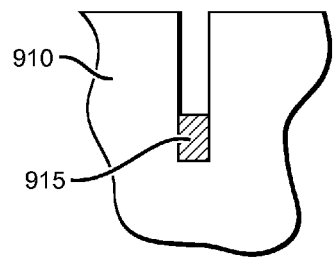
Figure 10:
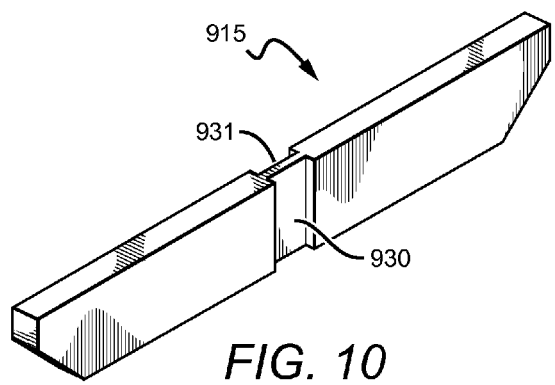
FIG. 10 is a perspective view of the rib in FIG. 9.

FIGS. 9a-c show cross section views of another embodiment of a rib and flange with improved mechanical connections. Rib 915 has notches 930 and 931, as best seen in FIG. 10. Unlike notch 430, which is disposed on the bottom surface of rib 415 (see FIG. 6), notches 930, 931 are disposed on the sides of rib 915. Notches 930, 931 slideably engage the sides of flange 910. Notches 930, 931 provide increased mechanical connection between rib 915 and flange 910. In addition, notches 930, 931 provide additional part-to-part contact surfaces (e.g., metal-to-metal contact) and reduce the tensile stress experienced by the weld at both points 1 and 2 at the seam between rib 915 and flange 910. As such, weld 921 can alternatively be replaced with an adhesive bonding or a mechanical fastener. In preferred embodiments, weld 921 is completely eliminated and an adhesive such as a slow hardening epoxy can be used to join rib 915 to flange 910. The slow hardening epoxy also advantageously provides time for additional assembly steps.

Figure 11:
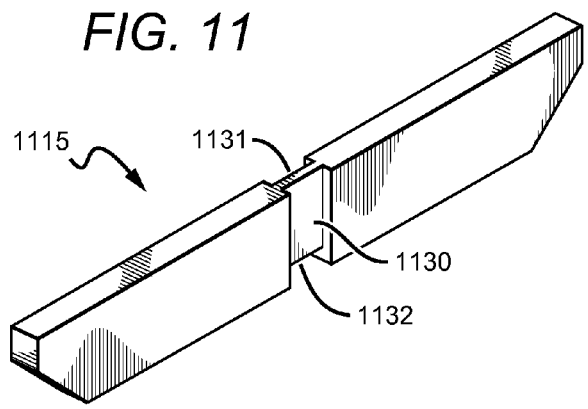
FIG. 11 is a perspective view of another embodiment of a rib having three notches.

FIG. 11 shows a rib 1115, which has a combination of the notches of ribs 415 and 915. Specifically, rib 1115 has first and second side notches 1130, 1131, and a bottom notch 1132. Rib 1115 has even more mechanical connection with a flange than the ribs previously described.

While the notches shown in the above figures are all square-shaped, those of skill in the art will appreciate that any notch shape that matches a corresponding edge shape can be used consistently with the inventive subject matter disclosed herein. In other embodiments, the notch-shape could comprise a V-notch, semicircle, or even an irregular polygon. As long as the notch shape is configured to engage the edge(s) of a flange opening, many different shapes can be used.

Figure 12:
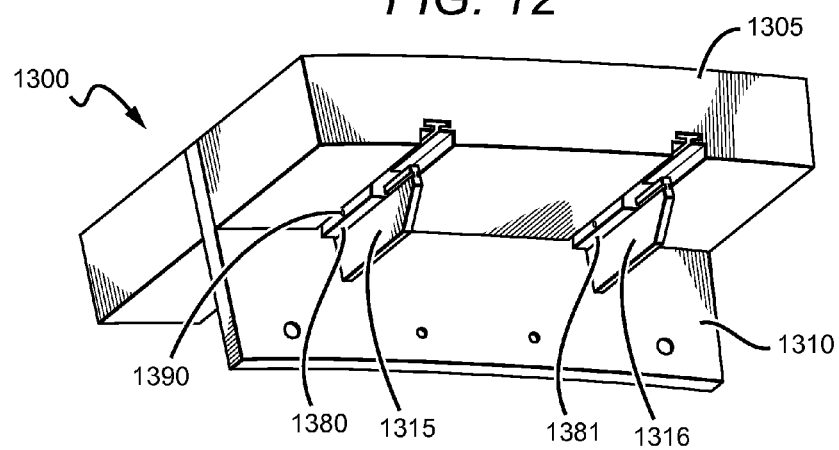
FIG. 12 is a perspective view of rotor pole segment having a flange, ribs, and inserts connecting the ribs to the rotor pole.
Figure 13A:
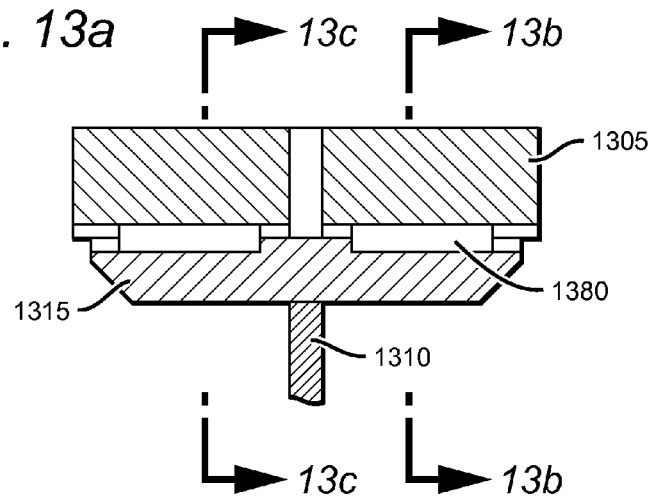

FIG. 12 shows a perspective view of a rotor pole segment 1300, which includes a rotor pole 1305, flange 1310, and a rib 1315. FIGS. 13a-c show different cross section views of rotor pole 1300. Rib 1315 (shown in FIG. 14) is coupled with rotor pole 1305 via an insert 1380 (shown in FIG. 15). Insert 1380 has a first engaging end 1381 and a second engaging end 1382. End 1381 is configured to slideably engage channel 1306 of rotor pole 1305. End 1382 is configured to slideably engage edge 1316 of rib 1315. Rib edge 1316 comprises a t-shaped protrusion (e.g., a dual-notched or dual-channeled edge). Insert 1380 has a through-hole 1383, which has been configured to align with the through-hole 1317 of rib 1315 (e.g., appropriately sized and positioned on insert 1380). Once hole 1383 is aligned with hole 1317, cotter pin 1390 can be inserted through hole 1383 to securely fasten insert 1380 to rib 1315.

Insert 1380 provides several advantages by elimination of welding: (1) no thermal stress; (2) all tensile stresses in welds are replaced by compression stresses in metal-to-metal engagements; (3) no risk of damaging the rotor windings by high welding temperature; (4) non-destructive testing (NDT) is no longer required; (5) simple mechanical assembly instead of highly qualified welding operation.

Those of skill in the art will appreciate that fasteners other than cotter pins can be used to securely fasten insert 1380 to rib 1315. For example, ends 1381, 1382 can be configured to tightly engage channel 1306 and rib edge 1316. Alternatively, adhesives and/or welds could be used to securely attach insert 1380 to rib 1315 and rotor pole 1305.

Those of skill in the art will also appreciate that the inventive subject matter disclosed herein can be used for gearless drives in any number of applications. Gearless drives for mills and conveyor belts are specifically contemplated; however, the inventive subject matter is not intended to be limited by any particular application.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include commercially practical values. Similarly, all lists of values should be considered as inclusive of intermediate values unless the context indicates the contrary.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A gearless drive comprising:
   a substantially cylindrical rotor pole having an inner radial surface;
   a flange coupled with the rotor pole and having a first opening formed on a radially outer surface of the flange;
   a first rib at least partially disposed in the first opening and coupled with the flange and the inner radial surface of the rotor pole; and
   wherein the first rib has a first notch engaged with at least a first edge of the first opening.

2. The gearless drive of claim 1, wherein the first notch is disposed on a radially inner surface of the rib.

3. The gearless drive of claim 1, wherein the first notch is disposed on a first side surface of the rib substantially perpendicular to a center axis of the rotor pole.

4. The gearless drive of claim 3, further comprising a second notch disposed on a second side surface of the rib opposite the first side surface and configured to engage a second edge of the first opening.

5. The gearless drive of claim 1, wherein the first notch and first edge are square-shaped.

6. The gearless drive of claim 1, further comprising an insert configured to mechanically couple the first rib with the rotor pole.

7. The gearless drive of claim 1, further comprising a first fastener configured to fasten the first rib to the flange and a second fastener configured to fasten the first rib to the rotor pole.

8. The gearless drive of claim 7, wherein the first fastener and second fastener comprise an adhesive.

9. The gearless drive of claim 7, wherein the first fastener comprises an adhesive and the second fastener comprises a weld.

10. The gearless drive of claim 1, wherein the first opening comprises a slot.

11. The gearless drive of claim 1, wherein the first notch is configured to slideably engage the first edge.

12. The gearless drive of claim 1, wherein:
    the flange comprises a flat plate; and
    the first rib is coupled with the flange via an adhesive.

13. The gearless drive of claim 12, wherein an adhesive is disposed between the first notch and the first opening.

14. The gearless drive of claim 12, wherein the adhesive comprises an epoxy that hardens over time.

15. The gearless drive of claim 12, wherein the flange has a second opening.

16. The gearless drive of claim 15, wherein the gearless drive comprises a second rib disposed in the second opening and coupled with the flange via an adhesive.

* * * * *